(12) United States Patent
Stamires et al.

(10) Patent No.: US 6,903,040 B2
(45) Date of Patent: Jun. 7, 2005

(54) CONTINUOUS PROCESS AND APPARATUS FOR THE EFFICIENT CONVERSION OF INORGANIC SOLID PARTICLES

(75) Inventors: Dennis Stamires, Newport Beach, CA (US); Paul O'Connor, Hoevelaken (NL); Erik Jeroen Laheij, Amstelveen (NL); Johannes Wilhelmus Maria Sonnemans, Soest (NL)

(73) Assignee: Akzo Nobel NV (NL)

(*) Notice: Subject to any disclaimer, the term of this patent is extended or adjusted under 35 U.S.C. 154(b) by 0 days.

(21) Appl. No.: 10/141,800

(22) Filed: May 8, 2002

(65) Prior Publication Data

US 2003/0003035 A1 Jan. 2, 2003

Related U.S. Application Data

(60) Provisional application No. 60/290,149, filed on May 10, 2001.

(30) Foreign Application Priority Data

Jun. 13, 2001 (EP) .............................. 01202270

(51) Int. Cl.$^7$ ............................... B01J 29/06
(52) U.S. Cl. ................... 502/60; 502/71; 502/355; 502/414; 502/415; 502/80; 502/232
(58) Field of Search ............................ 423/625, 628, 423/629; 502/355, 414, 415, 60, 80, 71, 232

(56) References Cited

U.S. PATENT DOCUMENTS

| | | | |
|---|---|---|---|
| 2,244,194 A | 6/1941 | Haglund | 23/143 |
| 3,095,280 A | 6/1963 | Soudan et al. | 23/290 |
| 3,887,693 A | 6/1975 | Nevado et al. | 423/489 |
| 4,591,491 A | 5/1986 | Christophliemk et al. | 423/329 |
| 4,634,581 A | 1/1987 | Cambridge et al. | 423/126 |
| 4,797,139 A | 1/1989 | Bauer | 51/293 |
| 4,818,509 A | 4/1989 | Dwyer et al. | 423/329 |
| 5,055,019 A | 10/1991 | Meyer et al. | 423/625 |
| 5,964,693 A | 10/1999 | Brekau et al. | 516/82 |
| 6,146,613 A | 11/2000 | Anglerot et al. | 423/700 |
| 6,429,172 B1 * | 8/2002 | Tsukada et al. | 502/439 |
| 6,503,867 B1 * | 1/2003 | Stamires et al. | 502/335 |
| 6,506,358 B1 * | 1/2003 | Stamires et al. | 423/625 |
| 6,555,496 B1 * | 4/2003 | Stamires et al. | 502/327 |

FOREIGN PATENT DOCUMENTS

| | | | |
|---|---|---|---|
| CA | 1154932 | 10/1983 | C01F/7/00 |
| DE | 256504 | 5/1988 | C01D/5/00 |
| DE | 38 23 895 | 12/1989 | C04B/35/10 |
| FR | 2709302 | 3/1995 | C01F/7/14 |
| GB | 939617 | 10/1963 | |
| JP | 5145560 | 12/1976 | C01B/33/24 |
| JP | 6219727 | 8/1994 | |

OTHER PUBLICATIONS

Japanese Abstract JP 06219727, Sep. 8, 1994.
International Search Report of PCT/EP 02/04938, dated Jan. 28, 2003.
Derwent Abstract of JP 5014–639 Dec. 12, 1970.
Derwent Abstract of Canadian Patent No. 1,251,351 Oct. 21, 1998.

* cited by examiner

Primary Examiner—Christina Johnson
(74) Attorney, Agent, or Firm—Louis A. Morris

(57) ABSTRACT

The invention pertains to a continuous process for the conversion of inorganic solid starting particles which either are amorphous or possess a degree of order into inorganic solid product particles which
(a) when the starting particles are amorphous, possess a degree of order, or
(b) when the starting particles possess a degree of order, possess a different order, a different degree of order, or no order,
which product particles are suitable for use in or as a catalyst, in or as a carrier, or in or as an adsorbent, in which process the starting particles are dispersed in a liquid thus forming a suspension. The suspension flows through at least two separate conversion vessels (3) which are connected in series and the suspension is agitated in each of these vessels (3). The invention furthermore relates to an apparatus suitable for carrying out the process according to the invention. This invention allows the processing of suspension with a high Solids to Liquid Ratio.

23 Claims, 2 Drawing Sheets

CONTINUOUS PROCESS AND APPARATUS FOR THE EFFICIENT CONVERSION OF INORGANIC SOLID PARTICLES

This application claims priority of U.S. patent application Ser. No. 60/290,149, filed on May 10, 2001 and European Patent Application Serial No. 01202270.3, filed on Jun. 13, 2001.

BACKGROUND OF THE INVENTION

1. Field of the Invention

The invention pertains to a continuous process and related apparatus for the conversion of inorganic solid starting particles which either are amorphous or possess a degree of order into solid inorganic product particles which (a) when the starting particles are amorphous, possess a degree of order, or (b) when the starting particles possess a degree of order, possess a different order, a different degree of order, or no order.

2. Prior art

Processes for the conversion of inorganic solid particles in the form of a suspension are known, for instance from German patent publication DE 38 23 895, which describes a process for the preparation of boehmite and alpha-aluminum oxide monohydrate compounds having variable pore radii in the range of 3 to 100 nm. In the said process suspensions containing 5 to 15 wt % $Al_2O_3$ are aged in an autoclave at a steam pressure of 1 to 30 bar, preferably for between 0.5 and 20 hours, whilst stirring at a peripheral speed of 1.0 to 6.0 m/s. The said stirring preferably takes place in a cascade reactor with 2 to 10, preferably 4 to 10 stages (as shown in FIG. 3 of DE 38 23 895).

The Solids to Liquid Ratio (SLR) in the process according to DE 38 23 895 ranges from roughly 0.05 to 0.18, which means that the suspensions used in this process are relatively large in volume and require similarly large reactors and peripheral equipment.

For many applications, e.g., catalysts, carriers, adsorbents, fillers, electronic materials and/or nano-technology applications, it is preferred to convert solid inorganic starting particles which either are amorphous or possess a degree of order into inorganic solid product particles which possess a degree of order, a different order, a different degree of order, or no order. In this specification "a degree of order" is defined as the presence of a crystalline or quasi-crystalline, i.e. non-amorphous, phase detectable by X-ray diffraction (XRD), scanning electron microscopy (SEM), transmission electron microscopy (TEM) or extended X-ray adsorption fine structure (EXAFS). Normally, a degree of order will be X-ray detectable (either as a peak or as a lump), but in the case of very small crystallites (i.e. below the XRD detection limit) more advanced techniques are required to detect a degree of order: SEM, TEM, or EXAFS. On the other hand, amorphous is defined as not having a degree of order as defined above. The degree of order can be estimated for instance from the width of the XRD-peak (or lump) if the crystallites are X-ray detectable. The narrower this peak, the higher the degree of order. A different order will follow from the detection of different crystal structures or morphologies as detected by the techniques mentioned above. No order means amorphous.

In order to minimise the costs of operation and to maximise energy conservation, the conversion of inorganic solid starting particles is preferably carried out in a continuous mode and with the minimum of liquid required to suspend the starting particles on the one hand and ensure proper flow characteristics on the other.

Suspensions consist of a continuous phase, i.e. a liquid, and a dispersed phase, i.e. solid particles. Suspensions can be homogeneous or heterogeneous. In this specification, homogeneous suspensions are defined as suspensions having a constant volume fraction of the continuous phase throughout the whole system. Suspensions without such a constant volume fraction of the continuous phase are referred to as heterogeneous. In these heterogeneous systems there are concentration gradients of the dispersed phase.

Suspensions can separate into a fraction with a higher volume fraction of the continuous phase and a fraction with a lower volume fraction of the continuous phase. Within this specification this phenomenon is referred to as segregation. Segregation can occur by the action of various forces, for instance centrifugal forces or gravity. Sedimentation is a form of segregation where the dispersed phase settles by gravity.

When a sediment is formed, part of the flow region within a reactor is blocked by a stagnant solid, reducing the volume available for free flow. With constant mass flux, the suspension will have to move through a smaller area, resulting in higher velocities of the continuous phase. This results in even more segregation and a non-ideal residence time distribution of the dispersed phase in the reactor.

The conversion of inorganic solid starting particles in a suspension may be performed continuously in traditional pipe reactors or cascade reactors as described for instance in the aforementioned DE 38 23 895, provided that the starting particles easily form a stable homogeneous suspension, e.g., a sol or a gel, and are of a more or less uniform particle size. Even then limitations in the Solids to Liquid Ratio (SLR) may occur due to the rheological behavior of the homogeneous suspension. High energy input, e.g., high-shear mixing, may alleviate these difficulties if the suspensions exhibit shear-thinning behavior.

Unfortunately, many industrially interesting materials are not easily suspendable and/or do not form stable homogeneous suspensions at high solids to liquid ratios. This is due either to their large particle size (say >0.1 micron) or to their chemical incompatibility with the liquid, making segregation of the particles from the liquid very likely. This means that the solid particles will show a tendency to form a sediment layer, resulting in an uncontrolled and non-ideal residence time distribution in the reactor. This lack of homogeneity may hinder the conversion, especially when additional components, for instance colloidal seeds or other reactants, need to be contacted with the starting particles. This situation may be further aggravated if we are dealing with starting particles of different sizes.

Contrary to the case of the stable homogeneous suspensions described above, where high shear can assist in homogenisation and reduction of the viscosity, unstable suspensions tend to segregate even faster when a high energy input is added to the system. Therefore, good mixing throughout the whole reactor and avoiding any dead or non-mixing zones is preferred to avoid non-ideal residence time distributions and to promote efficient conversion of the starting particles.

Alternatively, expensive chemicals need to be added in order to stabilize and disperse the suspension and to prevent segregation.

SUMMARY OF THE INVENTION

It is an object of the present invention to enable the conversion of suspended inorganic solid starting particles, such as (raw) ore and/or mineral particles, into suspended inorganic solid product particles suitable for use in or as a catalyst, in or as a carrier, or in or as an adsorbent.

In one embodiment, the present invention is a continuous process for the conversion of inorganic solid starting particles which either are amorphous or possess a degree of order into inorganic solid product particles which:
(a) when the starting particles are amorphous, possess a degree of order, or
(b) when the starting particles possess a degree of order, possess a different order, a different degree of order, or no order, which product particles are suitable for use in or as a catalyst, in or as a carrier, or in or as an adsorbent. In the process the starting particles are dispersed in a liquid thus forming a suspension. The suspension flows through at least two separate conversion vessels which are connected in series, the suspension being agitated in each of these vessels.

The invention further pertains to an apparatus for the conversion of inorganic solid starting particles as set out above, including a first vessel for dispersing the starting particles in a liquid so as to form a suspension.

DETAILED DESCRIPTION OF THE INVENTION

Figure 1:
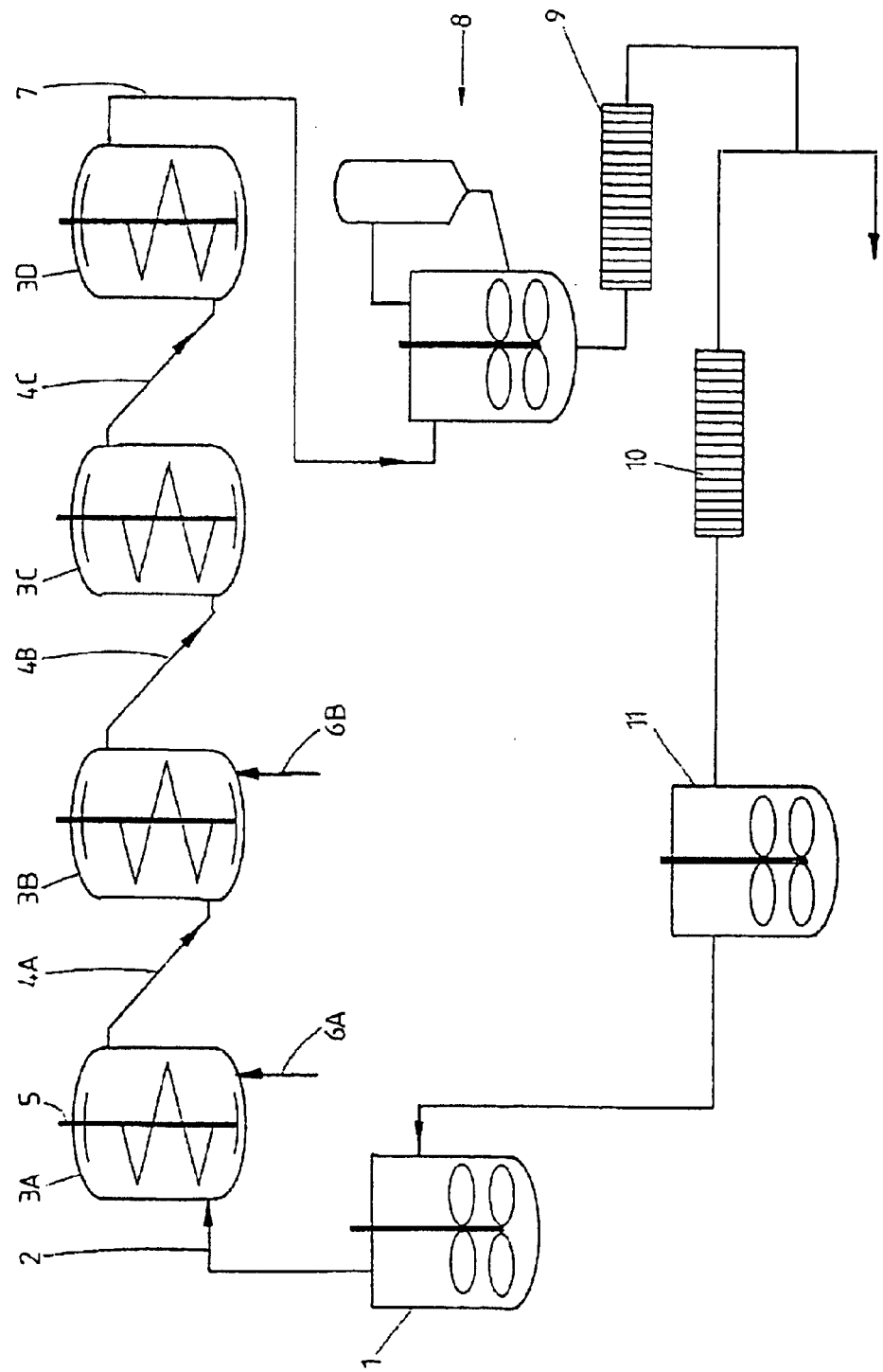
FIG. 1 presents a schematic layout of the apparatus according to the present invention.

With the process of the present invention, it is possible to process suspensions with high Solids to Liquid Ratios (SLR) in a continuous mode, thereby enabling the use of relatively compact equipment and offering low costs of operation and energy consumption.

It was found that, as a result of agitation and the use of a series of separate vessels, suspensions having a high Solids to Liquid Ratio (SLR) can be processed without an unacceptable level of segregation of the solid particles.

Preferably, the suspension flows substantially upward through the said vessels and/or the mixer exerts mainly axial forces on the suspension, such that the whole reactor is well mixed and dead zones are avoided. With these measures, segregation of the solid particles and the liquid can be further suppressed and the solids to liquid ratio can be further increased. Also, an inhomogeneous distribution in the suspension of smaller particles on the one hand and larger particles on the other is substantially avoided.

A further advantage of the present invention resides in the possibility of fine-tuning particular (aspects of) process steps. It is thus preferred that at least one particular property of the product particles is controlled and/or amplified by adapting, preferably optimizing, the process conditions in at least one of the vessels. Within the framework of the present invention, this technique or procedure is called "de-coupling." Hence, de-coupling means that in the series of conversion vessels the process conditions in one or more of the vessels differ from those in the other vessel or vessels.

This de-coupling of process stages can be used for, inter alia, effective control of the structure of the product particles. The advantage of de-coupling is not trivial: by de-coupling the various process steps it becomes possible for instance to optimize the mixing and handling of the solid-liquid suspension which can change in rheological behavior during its conversion. Thus segregation, in the form of either sedimentation or separation of solids with different particle sizes, can be avoided even at high SLR.

Moreover, de-coupling allows for optimization of the conditions of multi-stage processes. For instance, the temperature or pH can be changed in each step and seeds, catalysts or reactants can be added in any of the steps.

The apparatus according to the present invention is characterised by at least two, preferably three to five, separate and substantially vertical vessels which are connected in series and which each comprise a dedicated means for agitating the suspension. Axial or coaxial mixers are preferred.

The invention can be used for the conversion of (low-cost) inorganic solid starting particles, comprising for instance aluminum oxides or hydroxides, such as bauxite, crystalline aluminum trihydrate (ATH), gibbsite, bauxite ore concentrate (BOC) or thermally treated forms thereof, such as calcined and/or flash-calcined forms; synthetic and natural clays, such as kaolin, sepiolite, hydrotalcite or bentonite; silica ores, such as sand or diatomaceous earth; magnesium sources, such as magnesium salts, magnesium oxides or hydroxides, e.g., brucite, magnesium carbonate, magnesium hydroxy carbonate; zirconium compounds, such as zirconia, zircon or baddeleyite; titanium oxides or hydroxides; sorbents, catalysts or catalyst precursors, for instance in the form of microspheres, i.e. spray-dried particles, etc. The starting particles can first be reduced in size by mechanical milling, grinding, ultrasound treatment or chemical treatment with organic or inorganic acids or bases, such as nitric acid, sulfuric acid, acetic acid, formic acid, oxalic acid or caustic. Furthermore, improvements in conversion and process operations may be achieved if these starting particles are pretreated in a high-energy deformation step, for instance milling, grinding, extrusion, flash calcination, flash freezing, ultrasound treatment, and microwaving. Such treatments can damage the particles, e.g., roughen their surface. It is even possible to use spent catalyst, ground brick, cement particles, ground stone or harbor sludge as starting particles.

When the starting particles are amorphous, the product particles possess a degree of order; when the starting particles possess a degree of order, the product particles possess a different order, a different degree of order, or no order at all. An example of the conversion of amorphous starting particles into product particles with a degree of order is the conversion of a precipitated mixture of aluminum sulfate and aluminum nitrate into boehmite. Examples of the conversion of starting particles with a degree of order into product particles with a different order, a different degree of order or no order are, respectively, the conversion of bauxite ore concentrate (BOC) into boehmite, the conversion of quasi-crystalline boehmite into micro-crystalline boehmite, and the conversion of aluminum trihydrate (ATH) with sodium silicate into an amorphous Si—Al cogel.

The conversion of the starting particles is conducted in the minimum of liquid required to suspend the materials on the one hand and to ensure proper flow characteristics on the other. Suitable liquids are for instance water, alcohols such as methanol, ethanol, n-propanol, isopropanol, etc., and hydrocarbon liquids such as toluene, hexane, white spirits, gasoline, etc. The liquid may contain dissolved material, such as sodium silicate, sodium aluminate, aluminum chloride, aluminum sulfate, vanadium compounds, phosphates and/or other metal salts.

Preferred products of the present process include shaped particles suitable as or for use in Fluidized Catalytic Cracking (FCC) catalysts, Hydro Processing Catalysts (HPC), Automotive Exhaust Catalysts or sorbents, comprising or essentially consisting of product particles obtained with the process according to the present invention.

FIG. 1 shows a schematic layout of a plant for carrying out the present invention. The said plant comprises a feed preparation vessel 1, to which solid inorganic starting particles (for instance bauxite ore concentrate, BOC or flash-calcined BOC, with an average particle size of 100 microns) and optionally seeds (for instance boehmite with an average particle size of 200 nm), caustic and/or acid are added and mixed with liquid. Forced by way of a feed pump, the resulting suspension is led through a duct 2 to an inlet of the first of at least two, but preferably three to five, conversion vessels. By way of example, FIG. 1 displays four such vessels: 3A–3D. Each of the vessels 3A–3D is provided with an outlet near its top, which is connected by means of a duct to an inlet near or in the bottom of a subsequent vessel, thus connecting the vessels 3A–3D in series. Each of the conversion vessels 3A–3D further contains an axial mixer 5, for instance a double-helix impeller or an anchor stirrer combined with an EKATO-INTERMIG® (an impeller suitable for mixing slurries with low viscosity, of which the outer blades pump downward while the inner blades pump upward), with which the suspension is both mixed substantially vertically and transported upward and downward while avoiding any dead or non-mixed zones. The mixers 5 are driven by electromotors (not shown) mounted on top of the conversion vessels 3A–3D. Typically, the mixers 5 are rotated at speeds from 20 to 500 revolutions per minute (rpm).

Optionally, the process stages can be de-coupled by feeding additional ingredients (solvents, reactants, seeds or steam for heating purposes) to one or more of the conversion vessels by appropriate means such as injectors. For instance, a portion of the seeds can be fed to the second conversion vessel 3B via injector 6B. In this way it is possible to control the crystallite size and to obtain product particles with a small crystallite size instead of a large crystallite size.

Another way of de-coupling is changing the liquid during the process. This can be done by leading the suspension stream through a high-pressure solid-liquid separator (e.g. a centrifuge or high pressure filter) in between two conversion vessels, in which process the first liquid is removed and the remaining solid particles are mixed with a second liquid, and then leading the resulting mixture to the next conversion vessel, all in a continuous fashion.

It is also possible to provide one or more conversion vessels with an electrical transducer in order to introduce ultrasound waves into the suspension. This type of high energy can speed up the reaction. Another way to introduce high energy into the suspension is microwave treatment.

Suitable temperatures for the conversion of starting particles by the process according to the invention range from 20° to 300° C., preferably 50°–200° C., and even more preferably 100°–200° C. Depending on the liquid, the pressure resulting from the said temperatures may range from 1 to several tens of bars. If the liquid is water, a typical pressure would be roughly 10 bars at 170° C.

After conversion, the suspension containing the product particles (for instance boehmite with a particle size of 3–4 microns) leaves the last conversion vessel, e.g., the fourth vessel 3D, and is led through a duct 7 to a cooler unit 8, where the product is cooled down to, say, below 100° C. A mill 9 may be used to grind these product particles to an average particle size, e.g., roughly 1 micron, after which the suspension is separated into a product fraction of, e.g., 90% and a corresponding seeds fraction (10%). The seeds fraction is ground to particles having an average size of 0.3 to 0.5 micron in a further mill 10, which is connected to a seeds buffer tank 11, which in turn is connected to either the feed preparation vessel 1 or any one of the conversion vessels 3A–3D. By way of example, FIG. 1 displays its connection to the feed preparation vessel.

The Solids to Liquid Ratio (SLR) of the suspension is defined as the weight ratio of solids, including crystal water, to liquid in the suspension. The process according to the invention allows processing of suspensions having an SLR up to 1.33. The optimal SLR depends on the rheological behavior of the suspension, e.g. the tendency to form a gel. The viscosity of the suspension is preferably between 1 and 500 Pa·s at a shear rate of $0.1\ s^{-1}$. For aluminum (hydr)oxide suspensions, the SLR is preferably in the range from 0.5 to 1.33, even more preferably in the range from 0.65 to 1.00. The preferred viscosity of aluminum (hydr)oxide suspensions is also between 1 and 500 Pa·s at a shear rate of $0.1\ s^{-1}$.

The average residence time in the vessels, i.e. all vessels together, is preferably between 10 and 120 minutes.

If desired, the product particles formed in the present process may be shaped to form shaped bodies. Suitable shaping methods include spray-drying, pelletising, extrusion (optionally combined with kneading), beading, or any other conventional shaping method used in the catalyst and absorbent fields or combinations thereof. The amount of liquid present in the suspension used for shaping should be adapted to the specific shaping step to be conducted. It might be advisable to partially remove the liquid used in the suspension and/or add an additional or another liquid, and/or to change the pH of the precursor mixture to make the suspension gellable and thus suitable for shaping. Various additives commonly used in the different shaping methods, e.g. extrusion additives, may be added to the precursor mixture used for shaping.

With this process various materials can be produced starting from inexpensive (raw) materials. For instance, it is now possible to produce silica and silica-based materials from an inexpensive silicate ore such as sand. Prior art methods for the production of these materials use either sodium silicates (water glass), tetra-ethoxy silane (TEOS) or sol-gel methods. With the process according to the invention it is possible to produce homogeneous silicas and silica-based materials from sand at a high solids content, in a continuous mode, and with limited reaction times. The reaction comprises treating the silicate ore with acid in the first conversion vessel (3A), optionally ion-exchanging in the second conversion vessel (3B) by adding an effective amount of suitable ions, and aging in the third conversion vessel (3C). Moreover, part of the formed material may be recycled and used as a seed.

Another product which can easily be obtained by the process according to the invention is a layered magnesium silicate with a short range order, which can be prepared by high-temperature treatment, i.e. above 100° C., of a silica source (e.g., sand, silica sol, water glass, diatomaceous earth) and a magnesium source such as MgO, brucite, hydromagnesite or magnesium salts.

The process according to the invention is also suitable for the production of highly crystalline zirconia by recrystallization of zirconia ores (e.g. zircon or baddeleyite) and the production of zirconia-based solid super acids. These solid super acids can be obtained by recrystallization of zirconia ore via high-temperature treatment, i.e. above 100° C., in the first conversion vessel, followed by reaction with a sulfate- or phosphate-containing compound in the second conversion vessel.

The present process enables the production of gels. For instance, aluminum phosphate gels can be prepared by treating aluminum trihydrate, e.g., bauxite ore concentrate (BOC) or flash-calcined BOC, with phosphates such as $H_3PO_4$, $(NH_4)_2HPO_4$, $(NH_4)H_2PO_4$ or mixtures thereof in aqueous suspension. Likewise, Al-containing—cogels, e.g., Al—Zr cogel, Al—Ti cogel or Al—Si cogel, can be prepared from BOC or flash-calcined BOC and a Zr, Ti, and Si source, respectively. Additionally, as will be explained below, it is possible to use such gels, e.g., Si—Al cogels, as intermediates in the production of other materials.

With the process according to the invention it is also possible to produce and stabilize zeolites and other silica-aluminas from inexpensive starting materials at a high-solids content, in a continuous mode, and with limited reaction times.

For instance, an aluminum source, e.g. aluminum trihydrate, thermally treated forms thereof, boehmite, aluminum chlorohydrol, or mixtures thereof, and an acidic silica source, e.g. sodium (meta)silicate, are converted in conversion vessel (3A) into a Si—Al cogel. In the second conversion vessel (3B) seeds, templates, and further reactants can be added to support the crystallization of the cogel into a zeolite, for instance zeolite X, Y, A, ZSM, beta or mesoporous molecular sieves, depending on the seeds used. Part of the resulting product can be milled and recycled as a seed.

Alternatively, silica can be prepared in the first conversion vessel 3A (for instance from silicate ore or sand), with the zeolite production and the stabilization being performed in conversion vessels 3B and 3C. It is of course also possible to produce alumina (for instance from BOC) in conversion vessel 3A, followed by zeolite production and stabilization in conversion vessels 3B and 3C.

With the present process it is also possible to crystallize zeolites in situ by using microspheres as starting particles. These microspheres may comprise, for instance, kaolin (e.g., hydrous kaolin and/or calcined kaolin), aluminum trihydrate, and a silica binder (e.g., silica sol). Crystallization of zeolites in these microspheres can be performed by the addition of seeds, caustic, and a silica source, e.g., sodium silicate, to one of the vessels.

The so-formed zeolites can be stabilized or activated by treatment at high temperature and pressure, for instance in water above 100° C. and at autogenous pressure. This treatment can be performed during preparation of the zeolite, i.e. in the second conversion vessel, or afterwards in the last conversion vessel. Alternatively, ion-exchange (with for instance rare earth metals, Mg, Ca, Fe, Mn, V, ammonium, etc.), de-alumination (with acid) or de-silication (with base) can be performed in subsequent conversion vessels, at temperatures either below or above 100° C. This shows once more the advantage of de-coupling.

Another possibility is the formation of boehmite from inexpensive aluminum sources like aluminum trihydrate or a thermally treated form thereof, for instance BOC or flash-calcined BOC, or microspheres comprising an aluminum source. The crystallinity of boehmite can be varied by de-coupling, for instance by varying the moment of addition of seeds, varying the pH by adding acids or bases, and/or varying the temperature in the different vessels.

For instance, adding part of the seeds in the second conversion vessel will give boehmite with lower crystallinity than adding all the seeds in the first conversion vessel. Analogously, comparable results can be achieved by the addition of crystal growth inhibitors, such as gluconic acid, sodium gluconate, sucrose, swellable clays, and hydroxides, phosphates, sulfates, and silicates of ammonium and alkali or alkaline earth metals, to the second conversion vessel. Another way of changing the crystallinity, i.e. the degree of order, is by changing the temperature in the conversion vessels. Higher temperatures will result in more crystalline boehmites than lower temperatures. For instance, at temperatures above 100° C. micro-crystalline boehmite is formed, whereas at temperatures below 85° C. quasi-crystalline boehmite is formed. So, the ratio of micro-crystalline boehmite to quasi-crystalline boehmite can be varied by producing micro-crystalline boehmite at relatively high temperatures in the first conversion vessel and feeding an additional amount of aluminum source to the second conversion vessel, which is lower in temperature, resulting in the formation of quasi-crystalline boehmite.

A further method for changing the crystallinity is changing the pH: at a pH between 1 and 6 quasi-crystalline boehmite is formed, whereas at a higher pH micro-crystalline boehmite is formed.

Boehmite can also be prepared via aluminum chlorohydrol or aluminum nitrohydrol solutions. To this end, aluminum trihydrate, e.g., BOC, or its thermally treated form, e.g., flash-calcined BOC, is reacted in the first conversion vessel with hydrochloric acid or nitric acid to give, respectively, aluminum chlorohydrol and aluminum nitrohydrol. In the subsequent conversion vessels these solutions can be treated thermally or hydrothermally in the way described above in order to obtain a quasi-crystalline boehmite, a micro-crystalline boehmite or a mixture thereof.

The production of zeolite and the production of boehmite can be combined in the process according to the invention. For instance, in the first one to three conversion vessels micro-crystalline boehmite, quasi-crystalline boehmite or a mixture of both can be prepared from, e.g., BOC, flash-calcined BOC or microspheres comprising these aluminum sources. In subsequent conversion vessels a silica source, for instance sodium silicate or polysilicic acid, can be added, optionally together with zeolite seeds and caustic, to obtain a zeolite or a zeolite-containing composition. These zeolites can be ion-exchanged, ultrastabilized and/or de-aluminated in subsequent conversion vessels under hydrothermal conditions.

The process according to the invention is also very suitable for the preparation of anionic clay from inexpensive divalent and trivalent metal compounds. By anionic clays are meant hydrotalcite-like materials and layered double hydroxides, terms interchangeably used by those skilled in the art. Suitable divalent and trivalent metals are Mg and Al. Examples of Mg—Al anionic clays are hydrotalcite and meixnerite.

Suitable starting materials for the production of anionic clays by the process according to the invention are aluminum trihydrate, e.g., gibbsite or BOC, thermally treated forms thereof such as flash-calcined BOC, aluminum chlorohydrol, aluminum nitrohydrol, microspheres comprising aluminum trihydrate, kaolin, boehmite, and/or amorphous alumina, and magnesium oxide or hydroxide. De-coupling, i.e. varying the process conditions in the different conversion vessels, offers the possibility of varying the ratio of different anionic clay polytypes. For instance, in the first conversion vessel $3R_2$ anionic clay can be formed, while in the second conversion vessel carbonate can be added to this $3R_2$-type clay, forming a $3R_1$-type anionic clay.

Another option offered by this process is the formation of boehmite in the first conversion vessel and the formation of anionic clay in any of the following conversion vessels by the addition of a magnesium source, all in a continuous mode.

Optionally, a silica source may be added to one of the vessels, resulting in the formation of smectites or saponites.

Another method for preparing anionic clays involves the addition of a solid solution to the feed preparation vessel, followed by hydrothermal rehydration of the solid solution in the at least two conversion vessels to form an anionic clay. The anionic clays can be subjected to ion-exchange in one of the conversion vessels of the apparatus by introducing an anion-bearing salt into that vessel. Examples of suitable anions are carbonate, bicarbonate, nitrate, chloride, sulfate, bisulfate, vanadates, tungstates, borates, phosphates, and pillaring anions such as $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$ $HBO_4^{2-}$, $HGaO_3^{2-}$, $CrO_4^{2-}$, Keggin-ions, formate, acetate, and mixtures thereof.

In all these processes, additives may be added to any of the vessels to obtain doped materials, e.g., doped silica, doped boehmite, doped zeolites, doped magnesium silicates, doped anionic clays, and combinations thereof. Suitable additives are compounds containing elements selected from alkaline earth metals (for instance Ca and Ba), alkaline metals, transition metals (for example Mn, Fe, Ti, Zr, Cu, Ni, Zn, Mo, W, V, Sn), actinides, rare earth metals such as La, Ce, Nd, noble metals such as Pt and Pd, silicon, gallium, boron, and phosphorus.

All sorts of combinations of the above procedures can be used to form various composites, for instance anionic clay and boehmite-containing composites, or composites comprising anionic clay, boehmite, and zeolite. Such compositions can be prepared by adding the different starting materials as starting particles to the vessels, but also by using shaped bodies, e.g. microspheres, comprising the starting materials as the starting particles. By hydrothermally treating these shaped bodies, shaped bodies comprising the above-compositions can be obtained in situ. The advantage of such a process is that no shaping step is required after the hydrothermal treatment.

Moreover, this process can be used for the rejuvenation or activation of spent catalysts, such as FCC equilibrium catalysts.

The invention is further illustrated by the following Examples.

EXAMPLES

Reference Example A

The mixing behavior within a conversion vessel of the apparatus according to the present invention was studied by determination of the residence time distribution curve. If segregation occurs or non-mixing zones are present in the vessel, the distribution will deviate substantially from the theoretical residence time distribution of an ideally mixed reactor (CSTR).

Before the experiment started, the vessel, with a volume of 500 liters and agitated using a double-helix impeller at 76–83 rpm, was filled with a highly viscous shear-thinning alumina suspension (upflow). Subsequently, a suspension of BOC and boehmite seeds (Condea® P-200) with a solids to liquid ratio of 0.72 was pumped through the reactor with a flow rate of 48.3 l/min. The replacement of the shear-thinning alumina by BOC was measured by determining the particle size distribution of the suspension coming out of the reactor.

Figure 2:
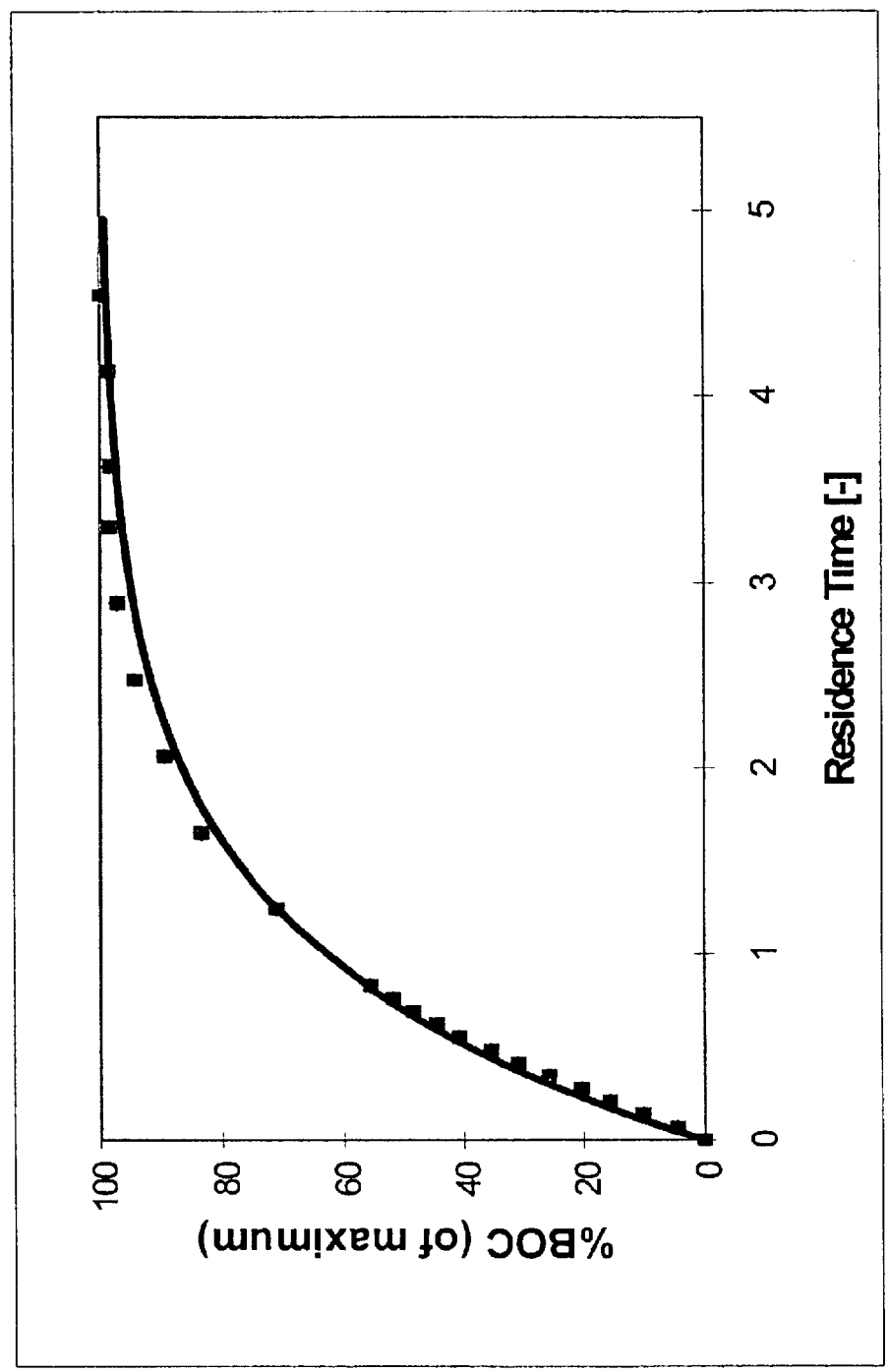
FIG. 2 presents the mixing behavior within a conversion vessel of the apparatus according to the present invention by way of the residence time distribution curve. The square bullets indicate the experimental data; the solid line indicates the theoretical curve for perfect mixing behavior.

The result of this experiment is shown in FIG. 2. From this graph it is clear that the measured residence time distribution exactly follows the theoretical line, indicating perfect mixing.

Comparison

Reference Example A was repeated, except that a pipe reactor with internal packings, viz. a Sulzer® pipe reactor, was used. Ideally, a pipe reactor should show a step change in BOC concentration (plug flow), which means that the BOC concentration of the suspension that leaves the reactor should immediately rise to 100%. However, this was not the case. After running the experiment for several hours, 90% of the pipe reactor was plugged, which means that 90% of the reactor was filled with settled solids which did not move. So, only 10% of the reactor was available for flow. The suspension had to move through an ever smaller area, resulting in a higher velocity and a reduction in residence (reaction) time by 90%.

Example 1

This Example illustrates the continuous preparation of micro-crystalline boehmite from gibbsite using the method and apparatus according to the invention. The apparatus contained three conversion vessels with a total volume of 30 l.

Gibbsite, P-200 (Condea®) seeds, and caustic were mixed in a feed preparation vessel (1) of 250 l. The solids to liquid ratio was 1.0. P-200 and caustic were added in amounts of 10 and 1 wt %, respectively, based on gibbsite.

The suspension was pumped to the first conversion vessel (3A). By way of steam injection the suspension was heated up to 180° C., thereby decreasing the solids to liquid ratio to 0.82.

The suspension was led through the subsequent two conversion vessels (3B–3C). The average residence time in the three conversion vessels was 45 minutes. The suspension in all conversion vessels was agitated using a double-helix impeller at 76–83 rpm. The temperature in all three conversion vessels was kept at 180° C. The pressure of the whole system was controlled by a pressure valve positioned immediately beyond the third conversion vessel. The system pressure in this experiment was maintained at 12 bars. After the third conversion vessel the suspension was cooled down to 60° C. by a shell and tube heat-exchanger.

This experiment was conducted for 375 minutes.

According to XRD measurements, 80% of the gibbsite was converted into micro-crystalline boehmite in the first conversion vessel, leaving 20% of gibbsite unconverted. In the second conversion vessel 95% micro-crystalline boehmite was measured, with 5% gibbsite remaining. After the third conversion vessel, no gibbsite was left.

Example 2

This Example illustrates the continuous preparation of quasi-crystalline boehmite from flash-calcined gibbsite using the method and apparatus according to the invention. The apparatus contained three conversion vessels with a total volume of 30 l.

Water was added to a feed preparation vessel (1) of 250 l. Subsequently, nitric acid and flash-calcined gibbsite were added. The resulting suspension was mixed The solids to liquid ratio of the mixture was 0.70. The pH of the mixture was 5.

The suspension was pumped to the first conversion vessel (3A). By way of steam injection the suspension was heated up to 180° C., thereby decreasing the solids to liquid ratio to 0.50.

The suspension was led through the subsequent two conversion vessels (3B–3C). The average residence time in the three conversion vessels was 30 minutes.

The suspension in all conversion vessels was agitated using a double-helix impeller at 76–83 rpm. The temperature in all three conversion vessels was kept at 180° C. The pressure of the whole system was controlled by a pressure valve positioned immediately beyond the third conversion vessel. The system pressure in this experiment was maintained at 12 bars. After the third conversion vessel the suspension was cooled down to 60° C. by a shell and tube heat-exchanger.

This experiment was conducted for 375 minutes.

The resulting product was a peptized low-crystalline boehmite alumina with an average particle size of 150 nm.

Example 3

This Experiment was conducted according to the procedure of Example 2. However, in this Example the pH of the mixture was between 2 and 3 and the average residence time was 60 minutes.

The resulting product was a peptized low-crystalline boehmite alumina with an average particle size of 125 nm.

Example 4

In the feed preparation vessel (1) 3.73 kg aqueous sodium silicate containing 28 wt % solids (as sol particles) was mixed with 40 g aluminum trihydrate and 2.80 kg water under atmospheric conditions to form a suspension. The solids to liquid ratio of this suspension was 0.20. In calculating the SLR, 28 wt % of the sodium silicate mass was counted as solid, the other 72 wt % was counted as liquid.

ZSM-5 seeds (10 wt %) with a particle size between 0.2 and 0.8 micron were added. The suspension was pumped to the first conversion vessel (3A) and continuously fed through the following three conversion vessels (3B–3D) with an average residence time of 300 minutes. The conversion vessels were all heated at 170° C. The suspension in all conversion vessels was agitated using a double-helix impeller at 76–83 rpm.

Of the suspension coming out of the final conversion vessel, 10% was cooled down to 40° C. by a heat-and-tube exchanger and milled in a wet bead mill until the average particle size was reduced from 5–10 to 0.2–0.8 micron. This suspension was recycled to the feed preparation vessel.

XRD indicated that the product particles formed were ZSM-5 crystallites with a SAR of 55.

Example 5

This Example illustrates the continuous preparation of anionic clay using the method and apparatus according to the invention. The apparatus contained three conversion vessels with a total volume of 30 l.

24.2 kg aluminum trihydrate (ATH M6® from Alcoa), 25 kg MgO (Zolitho 40® from Martin Marietta), and 150.8 kg water were mixed in a feed preparation vessel (1) of 250 l. The solids to liquid ratio was 0.33. The molar ratio MgO/$Al_2O_3$ was 4.

The suspension was pumped to the first conversion vessel (3A). By way of steam injection the suspension was heated up to 170° C., thereby decreasing the solids to liquid ratio to 0.25.

The suspension was led through the subsequent two conversion vessels (3B–3C). The suspension was pumped through the conversion vessels with such a flow that the average residence time was about 45 minutes.

The suspension in all conversion vessels was agitated using a double-helix impeller at 76–83 rpm. Because of a slightly exothermic reaction the temperature increased from 170° C. in the first conversion vessel to 180° C. in the second one. The pressure of the whole system was controlled by a pressure valve positioned immediately beyond the third conversion vessel. The system pressure in this experiment was maintained at 12 bars. After the third conversion vessel the suspension was cooled down to 60° C. by a shell and tube heat-exchanger.

This experiment was conducted for 375 minutes.

According to XRD-measurements, the resulting product was a Mg—Al anionic clay.

Example 6

This Example illustrates the continuous preparation of anionic clay using the method and apparatus according to the invention. The apparatus contained three conversion vessels with a total volume of 30 l.

In the feed preparation vessel 2.80 kg $Zn(NO_3)_2.6H_2O$ was dissolved in 27 kg water. 7.6 kg flash-calcined gibbsite (CP-3® from Alcoa) was added. The solids to liquid ratio was 0.26, thereby counting the dissolved zinc nitrate as part of the liquid phase. The pH of the mixture was 5.2.

The suspension was pumped to the first conversion vessel (3A). By way of steam injection the suspension was heated up to 170° C. The suspension was led through the subsequent two conversion vessels (3B–3C). The suspension was pumped through the conversion vessels with such a flow that the average residence time in the first conversion vessel was 45 minutes. After these 45 minutes, a Zn-alumina composition had been formed comprising 48 wt % boehmite with a crystallite size of 7.3 nm.

A suspension of 44 kg water and 11.2 kg MgO was fed to the second conversion vessel, resulting in an increase in flow rate and an average residence time in the second, third, and fourth conversion vessels of 50 minutes. After the fourth conversion vessel the suspension was cooled down to 60° C. by a shell and tube heat-exchanger.

According to XRD-measurements, the resulting product was MgZnAl—anionic clay.

Example 7

In the feed preparation vessel 0.42 kg of a suspension containing about 8 wt % of a commercially available clay mineral was mixed with 80 kg water for 30 minutes. Thereafter, 0.70 kg sodium gluconate was added, followed by 14.1 kg flash-calcined gibbsite (CP-3® from Alcoa). After 5 minutes of mixing, the suspension was pumped to the first conversion vessel (3A). By way of steam injection the suspension was heated up to 140° C. The suspension was led through the subsequent three conversion vessels (3B–3D). The suspension was pumped through the conversion vessels with such a flow that the average residence time in the conversion vessels was 60 minutes. After the fourth conversion vessel the suspension was cooled down to 60° C. by a shell and tube heat-exchanger.

XRD-measurements showed that a composition was formed comprising 63 wt % of boehmite. The surface area of the composition was 265 m²/g; the pore volume was 0.76 ml/g.

Example 8

In the feed preparation vessel 85.4 kg of a silica sol with a solids concentration of 9.5 wt % was mixed with 30 kg of 20% nitric acid. Thereafter, flash-calcined gibbsite (CP-3® from Alcoa, 8.7 kg) was added. The pH of the resulting suspension was adjusted to 3 with 2.84 kg of 20% nitric acid. The suspension was pumped to the first conversion vessel (3A). By way of steam injection the suspension was heated up to 170° C. The suspension was led through the subsequent three conversion vessels (3B–3D). The suspension was pumped through the conversion vessels with such a flow that the average residence time in the conversion vessels was 60 minutes. After the fourth conversion vessel the suspension was cooled down to 60° C. by a shell and tube heat-exchanger.

XRD-measurements showed that a composition was formed comprising 5 wt % and 95 wt % of an amorphous silica-alumina gel. The average particle size of this composition was 7.7 microns.

What is claimed is:

1. A continuous process for the conversion of inorganic solid starting particles which either are amorphous or possess a degree of order into inorganic solid product particles which
   (a) when the starting particles are amorphous, possess a degree of order, or
   (b) when the starting particles possess a degree of order, possess a different order, a different degree of order, or are amorphous,
   which product particles are suitable for use in or as a catalyst, in or as a carrier, or in or as an adsorbent, in which process the starting particles are dispersed in a liquid thus forming a suspension, and said suspension flows through at least two separate and substantially vertical conversion vessels which are connected in series, said suspension being agitated in each of these vessels, and the suspension flows substantially upward through the said vessels and/or the agitation is exerted on the suspension with mainly axial forces.

2. The continuous process of claim 1 wherein the suspension flows through from about three to about five separate conversion vessels.

3. The continuous process of claim 1 wherein the agitation is directed both upward and downward.

4. The continuous process of claim 1 wherein in at least one of the conversion vessels the process conditions differ from those in the other conversion vessel or vessels.

5. The continuous process of claim 4 wherein the process condition is the temperature.

6. The continuous process of claim 4 wherein the process condition is the pH.

7. The continuous process of claim 4 wherein the process conditions are changed by adding seeds and/or additional reactants.

8. The continuous process of claim 4 wherein the process conditions are changed by separating the liquid from and adding new liquid to the particles by way of a solid-liquid separator in between two conversion vessels.

9. The continuous process of claim 4 wherein the process conditions are changed by treating the suspension with ultrasound or microwaves.

10. The continuous process of claim 1 wherein the Solids to Liquid Ratio (SLR) of the suspension is in a range from 0.5 to 1.33.

11. The continuous process of claim 1 wherein the Solids to Liquid Ratio (SLR) of the suspension is in a range from 0.65 to 1.00.

12. The continuous process of claim 1 wherein the starting particles are pre-treated by grinding, milling, extrusion, calcination, flash calcination, flash freezing, treatment with ultrasound, treatment with microwaves or treatment with acid or base.

13. The continuous process of claim 1 wherein the starting particles are sand particles.

14. The continuous process of claim 1 wherein the starting particles comprise sorbent microspheres, catalyst microspheres or catalyst precursor microspheres.

15. The continuous process of claim 1 wherein the starting particles comprise aluminum trihydrate or a thermally treated form thereof.

16. The continuous process of claim 1 wherein the starting particles comprise magnesium oxide, magnesium hydroxide, magnesium carbonate or magnesium hydroxy carbonate particles.

17. The continuous process of claim 1 wherein the starting particles comprise zirconia, zircon or baddeleyite.

18. The continuous process of claim 1 wherein the product particles comprise a layered magnesium silicate.

19. The continuous process of claim 1 wherein the product particles comprise anionic clay.

20. The continuous process of claim 1 wherein the product particles comprise micro-crystalline boehmite and/or quasi-crystalline boehmite.

21. The continuous process of claim 1 wherein the product particles comprise a zeolite.

22. The continuous process of claim 21 wherein the zeolite is ZSM-5.

23. The continuous process claim 1 wherein at least one of the starting particles is selected from a spent catalyst, ground brick, cement particles, ground stone, or harbor sludge.

* * * * *